(12) United States Patent
Cogen

(10) Patent No.: US 6,455,616 B1
(45) Date of Patent: Sep. 24, 2002

(54) POLYETHYLENE CROSSLINKABLE COMPOSITION

(75) Inventor: Jeffrey Morris Cogen, Flemington, NJ (US)

(73) Assignee: Union Carbide Chemicals & Plastics Technology Corporation, Danburry, CT (US)

( * ) Notice: Subject to any disclaimer, the term of this patent is extended or adjusted under 35 U.S.C. 154(b) by 0 days.

(21) Appl. No.: 09/521,454

(22) Filed: Mar. 7, 2000

(51) Int. Cl.$^7$ .......................... C08K 5/14; C08K 5/3435
(52) U.S. Cl. ........................ 524/100; 524/461
(58) Field of Search ................ 524/100, 236, 524/461; 525/240, 450

(56) References Cited

U.S. PATENT DOCUMENTS 4,870,121 A    9/1989  Bamji et al. .................. 524/91
5,719,218 A  * 2/1998  Sarma .......................... 524/100

FOREIGN PATENT DOCUMENTS

WO     WO 99/21194    *  4/1999

* cited by examiner

Primary Examiner—David W. Wu
Assistant Examiner—R. Harlan

(57) ABSTRACT

A composition comprising:
 (a) polyethylene;
 (b) as a stabilizer, (A) 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (CAS number 192268-64-7) or (B) poly[(6-morpholino-s-triazine-2,4-diyl)[2,2,6,6-tetramethyl-4-piperidyl)imino]-hexamethylene[(2,2,6,6-tetramethyl-4-piperidyl)imino]] (CAS number 082451-48-7); and
 (c) an organic peroxide.

4 Claims, No Drawings

POLYETHYLENE CROSSLINKABLE COMPOSITION

TECHNICAL FIELD

This invention relates to polyethylene compositions useful in the preparation of cable insulation, semiconducting shields, and jackets.

BACKGROUND INFORMATION

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. Additional layers within this construction such as moisture impervious materials are often incorporated. Other cable constructions such as plenum and riser cable omit the shield.

Industry is constantly seeking to find polyethylene compositions, which will impart to power cables long-term heat aging stability.

DISCLOSURE OF THE INVENTION

An object of this invention, therefore, is to provide a polyethylene composition useful in power cables, which composition includes a stabilizer characterized by its capability of providing the power cables with long term heat aging stability. Other objects and advantages will become apparent hereinafter.

According to the invention, such a composition has been discovered. The composition comprises:

(a) polyethylene;

(b) as a stabilizer, (A) 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (CAS number 192268-64-7) or (B) poly[(6-morpholino-s-triazine-2,4-diyl)[2,2,6,6-tetramethyl-4-piperidyl)imino]-hexamethylene[(2,2,6,6-tetramethyl-4-piperidyl)imino]] (CAS number 082451-48-7); and (c) an organic peroxide.

DESCRIPTION OF THE PREFERRED EMBODIMENT(S)

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes can have a density in the range of 0.860 to 0.950 gram per cubic centimeter, and preferably have a density in the range of 0.870 to about 0.930 gram per cubic centimeter. They also can have a melt index in the range of about 0.1 to about 50 grams per 10 minutes.

The polyethylenes can be produced by low or high pressure processes. They can be produced in the gas phase, or in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. Nos. 4,508,842 (heterogeneous polyethylenes) and 5,332,793, 5,342,907, and 5,410,003 (homogeneous polyethylenes); a chromium based catalyst system such as that described in U.S. Pat. No. 4,101,445; a metallocene catalyst system such as those described in U.S. Pat. Nos. 4,937,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), high density polyethylene (HDPE) having a density greater than 0.940 gram per cubic centimeter and metallocene copolymers with densities less than 0.900 gram per cubic centimeter. The latter five polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 degrees C., and in the tubular reactor, the pressure is in the range of about 25,000 to about 45,000 psi and the temperature is in the range of about 200 to about 350 degrees C. Blends of high pressure polyethylene and metallocene resins are particularly suited for use in the application, the former component for its excellent processability and the latter for its flexibility.

Copolymers comprised of ethylene and unsaturated esters are well known, and can be prepared by the conventional high pressure techniques described above. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms. The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445, 4,302,565, and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and EPDMs, respectively. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 1 to about 20 grams per 10 minutes, and is preferably in the range of about 3 to about 8 grams per 10 minutes. The alpha-olefins can be the same as those mentioned above, and the catalysts and processes are also the same subject to variations necessary to obtain the desired densities and melt indices.

As noted, included in the definition of polyethylene are homopolymers of ethylene made by a conventional high pressure process. The homopolymer preferably has a density in the range of 0.910 to 0.930 gram per cubic centimeter. The homopolymer can also have a melt index in the range of about 1 to about 5 grams per 10 minutes, and preferably has a melt index in the range of about 0.75 to about 3 grams per 10 minutes. Melt index is determined under ASTM D-1238, Condition E. It is measured at 190° C. and 2160 grams.

The stabilizers useful in the polyethylene composition of this invention are (A) 1,6-hexanediamine, N,N'-bis(2,2,6,6-tetramethyl-4-piperidinyl)-polymer with 2,4,6-trichloro-1,3, 5-triazine, reaction products with N-butyl-1-butanamine and N-butyl-2,2,6,6-tetramethyl-4-piperidinamine (CAS number 192268-64-7) or (B) poly[(6-morpholino-s-triazine-2,4-diyl)[2,2,6,6-tetramethyl-4-piperidyl)imino]-hexamethylene[(2,2,6,6-tetramethyl-4-piperidyl) imino]] (CAS number 082451-48-7).

The organic peroxide preferably has a decomposition temperature of 100 to 220 degrees C. for a half-life of 10 minutes and can be exemplified by the following compounds [the numbers set off by the parentheses are their decomposition temperatures (in degrees C.)]: succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di (benzoyl peroxy)hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2,5-di(t-butyl-peroxy)hexane (155), t-butyl cumyl peroxide (155), t-butyl hydroperoxide (158), di-t-butyl peroxide (160), 2,5-dimethyl-2,5-di(t-butyl peroxy)hexane-3 (170), and alpha, alpha'-bis-t-butylperoxy- 1,4-diisopropylbenzene (160).

Based on 100 parts by weight of polyethylene, the proportions of the compounds can be about as follows (in parts by weight):

| Component | Broad Range | Preferred Range |
| --- | --- | --- |
| (b) stabilizer | 0.01 to 1.0 | 0.05 to 0.6 |
| (c) organic peroxide | 0.4 to 3 | 0.6 to 1.8 |

It should be understood that these proportions can vary outside of the stated ranges depending on the desired properties.

The composition of the invention can be processed in various types of extruders, e.g., single or twin screw types. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. For the purposes of this specification, it will be understood that the term "extruder" includes, in addition to conventional extruders, the combination of an extruder, crosshead, die, and a heating or cooling zone where a further forming of the material can be accomplished. The heating or cooling follows the die and may be, for example, an oven. In wire coating, where the material is crosslinked after extrusion, the die of the crosshead feeds directly into a heating zone, and this zone can be maintained at a temperature in the range of about 120 to about 260 degrees C., and preferably in the range of about 170 to about 220 degrees C.

The extrudate can be crosslinked by exposing it to a temperature greater than the decomposition temperature of the organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valvings maintain equilibrium of the steam and water and the respective fill lengths within the steam CV tube. Alternatively, a hot nitrogen gas CV tube may be used to cure the cable construction.

Conventional additives can be added to the polymer either before or during processing. The amount of additive is usually in the range of about 0.01 to about 50 percent (or more) by weight based on the weight of the resin, the higher percentages generally relating to fillers and fire retardants. Useful additives are antioxidants, ultraviolet absorbers, antistatic agents, pigments, carbon black, dyes, fillers, slip agents, fire retardants, plasticizers, processing aids, lubricants, scorch inhibitors, cure boosters, smoke inhibitors, halogen scavengers, flow aids, lubricants, water tree inhibitors such as polyethylene glycol, and viscosity control agents.

In order to provide a semiconducting composition it is necessary to incorporate conductive particles into the composition. These conductive particles are generally provided by particulate carbon black. Useful carbon blacks can have a surface area of about 50 to about 1000 square meters per gram. The surface area is determined under ASTM D 4820-93a (Multipoint B.E.T. Nitrogen Adsorption). The carbon black is used in the semiconducting shield composition in an amount of about 20 to about 60 percent by weight based on the weight of the composition, and is preferably used in an amount of about 25 to about 45 percent by weight. Examples of conductive carbon blacks are the grades described by ASTM N550, N472, N351, and N110, and acetylene black. Examples of semiconducting compositions are contained in U.S. Pat. Nos. 4,286,023, 4,612,139, and 5,556,697.

Since the stabilizers, which are included in the polyethylene compositions of the invention, are effective antioxidants, additional antioxidants are not required; however, examples of auxiliary antioxidants, which can be used, are: hindered phenols such as tetrakis [methylene(3, 5-di-tert-butyl-4-hydroxyhydro-cinnamate)]methane, bis [(beta-(3,5-ditert-butyl-4-hydroxybenzyl)-methylcarboxyethyl)]sulphide, and thiodiethylene bis(3,5-di-tert-butyl-4-hydroxy hydrocinnamate); phosphites and phosphonites such as tris(2,4-di-tert-butylphenyl)phosphite and di-tert-butylphenyl-phosphonite; thioesters such as dilaurylthiodipropionate, dimyristylthiodipropionate, dilaurylthiodipropionate (DSTDP), and pentaerythritol tetrakis (B-laurylthiopropionate); various siloxanes; and various amines such as polymerized 2,2,4-trimethyl-1,2-dihydroquinoline, 4,4'-bis(alpha,alpha-dimethylbenzyl) diphenylamine, and alkylated diphenylamines. Additional examples can be found in Plastic Additives Handbook, Gachter et al, 1985. These antioxidants can be used in amounts of about 0.05 to about 5 percent by weight based on the weight of the composition.

The advantage of the invention is the provision of long term heat aging stability to power cables. Other advantages are very low levels of moisture generation that can result from interaction of peroxide decomposition products with some antioxidants and their byproducts; resistance to electrical degradation (treeing); and minimal interference of the additives in the composition with the peroxide crosslinking process.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

The patents and publications mentioned in this specification are incorporated by reference herein.

The invention is illustrated by the following examples.

EXAMPLES 1 to 7

The aging is conducted under IEC 811 (IEC=International Electrotechnical Commission). The key criteria for suitability are RUE and RUTS of at least 75 percent after 3 weeks at 135 degrees C. Some industrial companies, however, require a higher level of RUE and RUTS, i.e., at least 75 percent after 10 days at 150 degrees C., and others have an even more stringent requirement for RUE and RUTS of at least 75 percent after 2 weeks at 150 degrees C. Examples 6 and 7, embodiments of the invention, meet the most stringent requirement, an unexpected result.

RUE=retained ultimate elongation at break.

RUTS=retained ultimate tensile strength at break.

The following stabilizers are tested (AO=antioxidant):

| | |
|---|---|
| AO-1 | N,N'''-[1,2-ethanediylbis[((4,6-bis[butyl(1,2,2,6,6-pentamethyl-4-piperidinyl)amino]-1,3,5-triazin-2-yl]imino]-3,1-propanediyl]]bis[N',N''-dibutyl-N',N''-bis(1,2,2,6,6-pentamethyl-4-piperidinyl)-1,3,5-triazine-2,4,6-triamine (CAS number 106990-43-6) |
| AO-2 | Dimethyl succinate polymer with 4-hydroxy-2,2,6,6-tetramethyl-1-piperidineethanol (CAS number 65447-77-0) |
| AO-3 | 2-(2'-hydroxy-3',5'-di-tert-amylphenyl)benzotriazole (CAS number 25973-55-1) |
| AO-4 | Poly[[6-[(1,1,3,3-tetramethylbutyl)amino]-s-triazine-2,4-diyl][2,2,6,6-tetramethyl-4-piperidyl)imino]hexamethylene[(2,2,6,6-tetramethyl-4-piperidyl)imino]] (CAS number 71878-19-8) |

-continued

| | |
|---|---|
| AO-5 | Bis(2,2,6,6-pentamethyl-4-piperidinyl) sebacate (CAS number 52829-07-9) |
| AO-6 | 1,6-hexanediamine, N, N'-bis(2,2,6,6-tetramethyl-4-piperidinyl)-polymer with 2,4,6-trichloro-1,3,5-triazine, | the indicated amount of dicumyl peroxide. The resulting crosslinkable polyethylene composition is then compression molded into plaques, cured, and cut into tensile bars. The tensile bars are then aged and tested in accordance with IEC 811. (All of the compositions used in examples 1 through 7 show excellent crosslinking properties as indicated by hot creep values tested in accordance with Insulated Cable Engineers Association (ICEA) T-28-562). The variables and results are set forth in the following Table:

TABLE

| | Composition in % by weight | | | | | | |
|---|---|---|---|---|---|---|---|
| | Comparative Examples | | | | | Embodiments of the Invention | |
| Component | Example 1 | Example 2 | Example 3 | Example 4 | Example 5 | Example 6 | Example 7 |
| LDPE | 97.95 | 97.95 | 98.00 | 98.00 | 97.95 | 97.95 | 98.00 |
| Dicumyl Peroxide | 1.65 | 1.65 | 1.60 | 1.60 | 1.65 | 1.65 | 1.60 |
| AO-1 | 0.40 | | | | | | |
| AO-2 | | 0.40 | | | | | |
| AO-3 | | | 0.40 | | | | |
| AO-4 | | | | 0.40 | | | |
| AO-5 | | | | | 0.40 | | |
| AO-6 | | | | | | 0.40 | |
| AO-7 | | | | | | | 0.40 |
| 3 weeks aging at 135° C. | | | | | | | |
| % RUTS | 105 | 64 | 29 | 62 | 54 | 120 | 90 |
| % RUE | 91 | 63 | 3 | 63 | 50 | 94 | 81 |
| 2 weeks aging at 150° C. | | | | | | | |
| % RUTS | 84 | 49 | 16 | 58 | 48 | 92 | 79 |
| % RUE | 79 | 43 | 5 | 60 | 23 | 77 | 77 |

-continued

| | |
|---|---|
| | reaction products with N-butyl-1-butanamine and N-butyl-2,2,6,6-tetramethyl-4-piperidinamine (CAS number 192268-64-7) |
| AO-7 | Poly[(6-morpholino-s-triazine-2,4-diyl) [2,2,6,6-tetramethyl-4-piperidyl) imino]-hexamethylene[(2,2,6,6-tetramethyl-4-piperidyl) imino]] (CAS number 082451-48-7) |

AO-1 and AO-2 are N-substituted 2,2,6,6-tetramethylpiperidines. AO-4, AO 5, AO-6, and AO-7 are 2,2,6,6-tetramethylpiperidines without N-substitution The tested compositions each contain a low density polyethylene (LDPE), one of the above antioxidants, and an organic peroxide. The LDPE is a homopolymer of ethylene prepared by a conventional high pressure process. It has a density of 0.92 gram per cubic centimeter and a melt index of 2.1 grams per 10 minutes. The composition, minus the peroxide, is dry blended, compounded on a twin screw extruder at 200 degrees C., and then pelletized, all in accordance with procedures well known to those in the art. The pellets are then soaked overnight at 85 degrees C. with

What is claimed is:

1. A composition-comprising:
   (a) polyethylene;
   (b) as a stabilizer, 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine; and
   (c) an organic peroxide.

2. The composition defined in claim 1 wherein the stabilizer is present in an amount of about 0.01 to about 1 part by weight based on 100 parts by weight of polyethylene.

3. The composition defined in claim 1 wherein the organic peroxide is present in an amount of about 0.4 to about 3 parts by weight based on 100 parts by weight of polyethylene.

4. The composition defined in claim 1 wherein, for each 100 parts by weight of polyethylene, the other components are present as follows:
   (b) about 0.05 to about 0.6 part by weight of stabilizer; and
   (c) about 0.6 to about 1.8 parts by weight of organic peroxide.

* * * * *